H. R. HOLTON.
INTAKE MANIFOLD SHIELD.
APPLICATION FILED MAY 17, 1920.

1,362,796.

Patented Dec. 21, 1920.

H. R. Holton, INVENTOR.

BY Lacy & Lacy, ATTORNEYS

United States Patent Office.

HENRY R. HOLTON, OF CHICAGO, ILLINOIS.

INTAKE-MANIFOLD SHIELD.

1,362,796.  Specification of Letters Patent.  Patented Dec. 21, 1920.

Application filed May 17, 1920. Serial No. 382,016.

*To all whom it may concern:*

Be it known that I, HENRY R. HOLTON, a citizen of the United States, residing at Chicago, in the county of Cook and State of Illinois, have invented certain new and useful Improvements in Intake-Manifold Shields, of which the following is a specification.

This invention relates to improvements in intake manifold heaters especially adapted for use on internal combustion engines.

An important object of this invention is to provide an intake manifold heater or shield for internal combustion engines having novel means for utilizing the heat radiating from the exhaust manifold for heating the fuel upon passing through the intake manifold.

A further object of this invention is to provide a heater for intake manifolds which may be readily and conveniently applied to internal combustion engines without in any way altering the construction of the same.

The invention further aims to provide a shield especially adapted for preventing the fuel supplied to the forward cylinder of an internal combustion engine from being chilled by the strong blast of air directed rearwardly of the engine by the cooling fan.

A further object of the invention is to provide a manifold shield which extends about the sides of the lower elbow of the manifold so as to prevent the condensation of the vaporized fuel upon entering the manifold from the carbureter.

A further object of the invention is to provide a device of the class described which is simple, efficient in use and cheap to manufacture.

Other objects and advantages of the invention will be apparent during the course of the following description.

Figure 1:
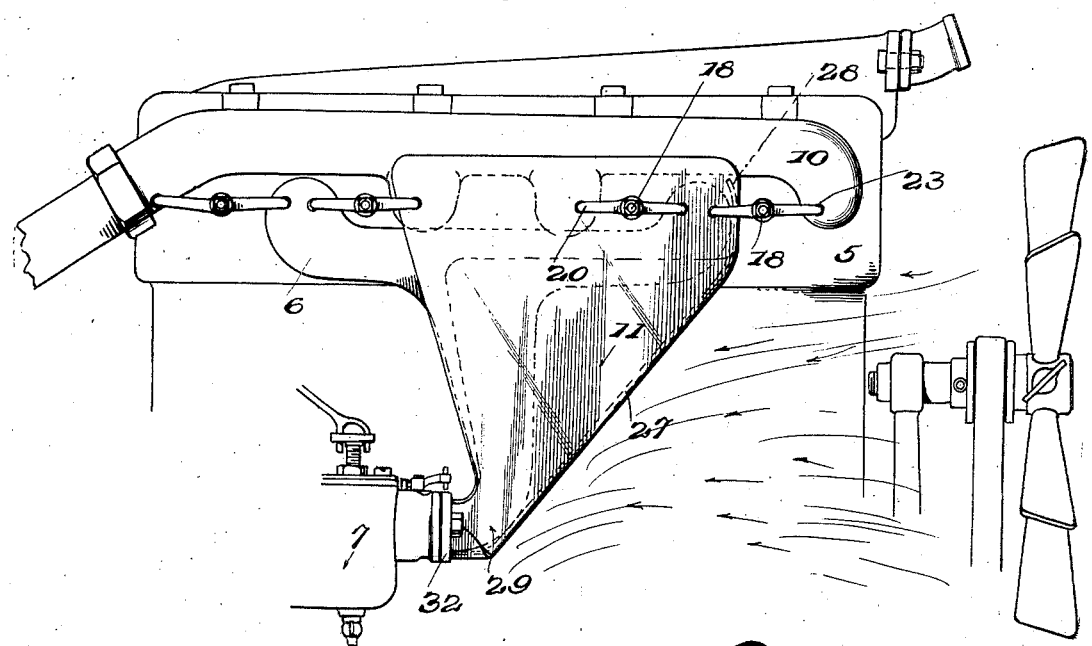
Figure 2:
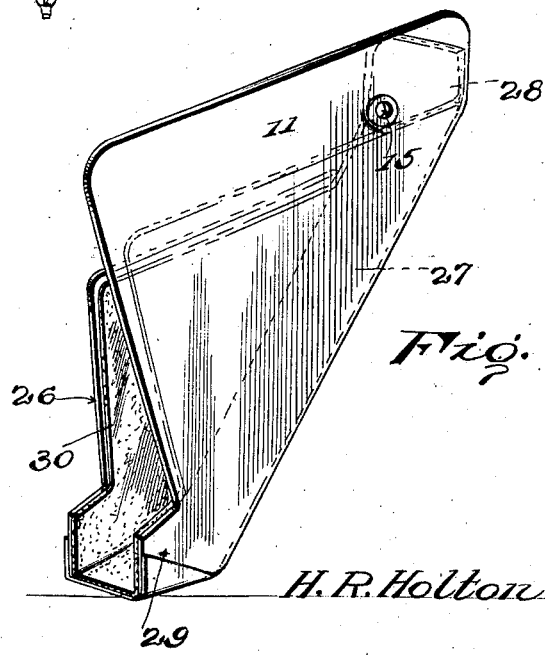

In the accompanying drawing forming a part of this application and in which like numerals are employed to designate like parts throughout the same, Figure 1 is a side elevation of the improved shield applied, Fig. 2 is a perspective of the same detached.

In the drawing wherein for the purpose of illustration is shown a preferred embodiment of the invention, the numeral 5 generally designates an internal combustion engine provided as usual with a plurality of cylinders which are supplied through an intake manifold 6 with a charge of fuel from the carbureter 7.

The exhaust gases are conveyed from the several cylinders of the internal combustion engine by an exhaust manifold 10 which, as is well known, becomes highly heated as the result of the continued flowing of the exhaust gases through the same. The invention forming the subject matter of this application aims to utilize the heat radiated from the exhaust manifold 10 for heating the fuel upon passing through the intake manifold to the several cylinders. In addition to conveying a part of the heat from the exhaust manifold to the intake manifold, the device acts to shield the forward arm of the manifold from the blast of air directed rearwardly by the fan of the engine.

The improved shield comprises a front plate 11 which, as illustrated in Fig. 1, is approximately of triangular formation and is provided adjacent its upper edge with a transverse opening 15 for receiving one of the clamping bolts 18 of the intake and exhaust manifolds. The said clamping bolt 18 carries a clamp 20 engaging the outer side of the plate 11 and pressing the same flatly into engagement with the outer sides of the intake and exhaust manifolds. The forward clamping bolt 18 which engages the forward portions of the intake and exhaust manifolds carries a clamp 23 which also engages the outer side of the plate 11 for securing the same in place. The upper longitudinal edge portion of the triangular plate 11 is engaged with the outer side of the exhaust manifold and thereby serves to convey the heat radiated from the exhaust manifold to the space surrounding the intake manifold.

An inner plate 26 of triangular formation is arranged in spaced parallel relation to the outer triangular plate 11 and is adapted to be arranged adjacent one side of the engine inwardly of the intake manifold. The triangular plates 11 and 26 are connected by an end wall 27 which, as illustrated in Fig. 1, is inclined and engages the lower portion of the intake manifold and the forward branch of the same. The upper portion of the end wall 27 is extended upwardly, as indicated at 28, and serves to protect the forward branch of the intake manifold from the blast of air directed rearwardly by the fan. The lower portions of the front and rear parallel walls and the end wall 27 are formed with an elbow 29 which extends beneath the elbow of the manifold and thereby shields the same from a rearwardly directed blast of air.

It will be noted that the elbow formed at the lower portion of the shield engages the laterally projecting flange 32 of the intake manifold so that the device is secured against movement when applied. With reference to Fig. 1, it will be noted also that the upper end of the end wall 27 engages the forward branch of the intake manifold and the lower side of the exhaust manifold, so that the upper portion of the device is also held against movement. By this construction the shield is prevented from becoming loosened as the result of vibration of the engine. The lower portion of the end wall 27 has its edge portions extended over the adjacent portions of the front and rear walls 11 and 26 respectively, so as to strengthen and reinforce the device.

As illustrated in Fig. 2, the shield is provided with a lining of asbestos 30 or other heat insulating element. The presence of heat insulating elements causes the heat radiated from the exhaust manifold to be confined within the shield until practically absorbed by the fuel within the intake manifold.

With reference to the foregoing description taken in connection with the accompanying drawing, it will be observed that a device constructed in accordance with this invention may be readily and conveniently applied without altering the construction of the engine or without changing the operation of the same. It will be noted also that the device effectively prevents the chilling of the forward portion of the intake manifold by the blast of air directed rearwardly by the engine fan. Secondly, it will be apparent that the heat radiated from the exhaust manifold is conveyed to the vicinity of the intake manifold whereby the gases in flowing through the intake manifold are preheated. In thus providing means for preheating the fuel charge to the several cylinders and particularly to the forward cylinder the efficient combustion of the fuel is assured.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

1. An intake manifold shield for internal combustion engines comprising a front plate adapted to be secured flatly in contact with the front side of an intake manifold, the lower portion of said front plate being extended angularly and adapted for engagement with the lateral flange of the intake manifold, and a projecting end wall extending along one edge of said front plate and adapted for protecting the forward portion of the intake manifold from a rearwardly directed blast of air, the lower portion of said end wall being formed with an elbow engaging the lower portion of the intake manifold.

2. An intake manifold shield comprising inner and outer spaced plates of triangular formation adapted to be arranged on opposite sides of an intake manifold, and an end wall connecting said plates and adapted for engaging the forward branch of the manifold and the lower portion of the same for securely holding the shield in position.

3. As an article of manufacture, an intake manifold shield formed from a single piece of metal formed to provide inner and outer spaced plates and a connecting end wall, the lower portion of said plates and said end wall being formed with an elbow snugly receiving the elbow of an intake manifold, and a heat-insulating element applied to the inner sides of said plates and said end wall.

4. The combination of an internal combustion engine having intake and exhaust manifolds, and a shield inclusive of spaced plates arranged on opposite sides of the intake manifold and a connecting end wall arranged forwardly of the intake manifold and engaging the upper and lower portions of the same.

5. As an article of manufacture, an intake manifold shield formed from a single piece of metal formed to provide inner and outer spaced plates and a connecting end wall, the lower portion of said plates and said wall being formed with an elbow for snugly receiving the elbow of an intake manifold.

In testimony whereof I affix my signature.

HENRY R. HOLTON. [L. S.]